United States Patent [19]

Takase

[11] 4,234,243
[45] Nov. 18, 1980

[54] REDUCING LENS SYSTEM

[75] Inventor: Hiroshi Takase, Hachiouji, Japan

[73] Assignee: Olympus Optical Co., Ltd., Tokyo, Japan

[21] Appl. No.: 7,589

[22] Filed: Jan. 29, 1979

[30] Foreign Application Priority Data

Feb. 7, 1978 [JP] Japan .................. 53/12693

[51] Int. Cl.³ .............................................. G02B 9/16
[52] U.S. Cl. .............................................. 350/226
[58] Field of Search .................................. 350/226

[56] References Cited

U.S. PATENT DOCUMENTS

| | | | |
|---|---|---|---|
| 2,391,114 | 12/1945 | Aklin | 350/226 |
| 3,039,359 | 6/1962 | Eggert et al. | 350/226 |
| 3,176,582 | 4/1965 | Tronnier et al. | 350/226 |

*Primary Examiner*—John K. Corbin
*Assistant Examiner*—Scott J. Sugarman
*Attorney, Agent, or Firm*—Cushman, Darby & Cushman

[57] ABSTRACT

A reducing lens system consisting of three lens components, having an aperture ratio of F/8 with the capability of providing a good image over the entire image surface, and a vignetting factor of 100% capable of maintaining brightness of the image to the peripheral portions thereof.

6 Claims, 6 Drawing Figures

REDUCING LENS SYSTEM

BACKGROUND OF THE INVENTION

The present invention relates to a reducing lens system and more particularly to a lens system in which an original paper to be copied is projected with reduction in its size while keeping constant the distance between the surface of the original paper and the surface of the projection as well as the dimensions of the surface of the original paper and the surface of the projection.

Reducing lens systems of high speed having a relatively large aperture ratio have been known as being conventional, but there has not existed such a lens system that has the vignetting factor of 100% in order to keep the brightness of the image to its peripheral portions.

SUMMARY OF THE INVENTION

The object of the present invention is to provide a reducing lens system of low cost consisting three lens components, having an aperture ratio F:8 with the capability of providing a good image over the entire image surface, and a vignetting factor of 100% capable of maintaining brightness of the image to the peripheral portion thereof.

Figure 1:
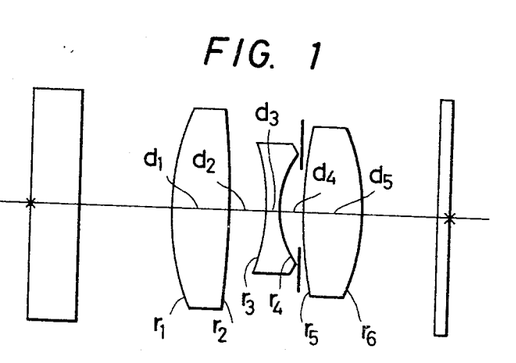
FIG. 1 is a sectional view of a reducing lens system according to the present invention.
Figure 2:
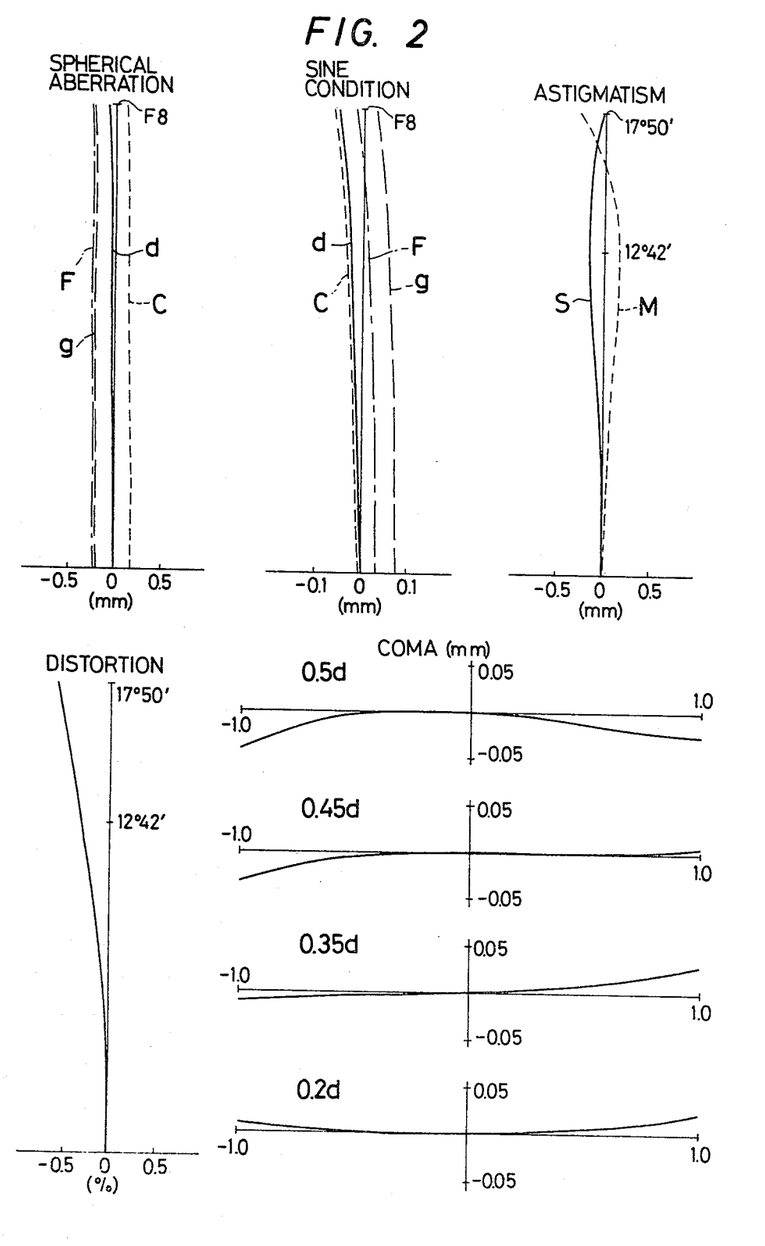
FIGS. 2 through 6 show graphs illustrating conditions of aberration of the embodiments 1 through 5.
Figure 3:
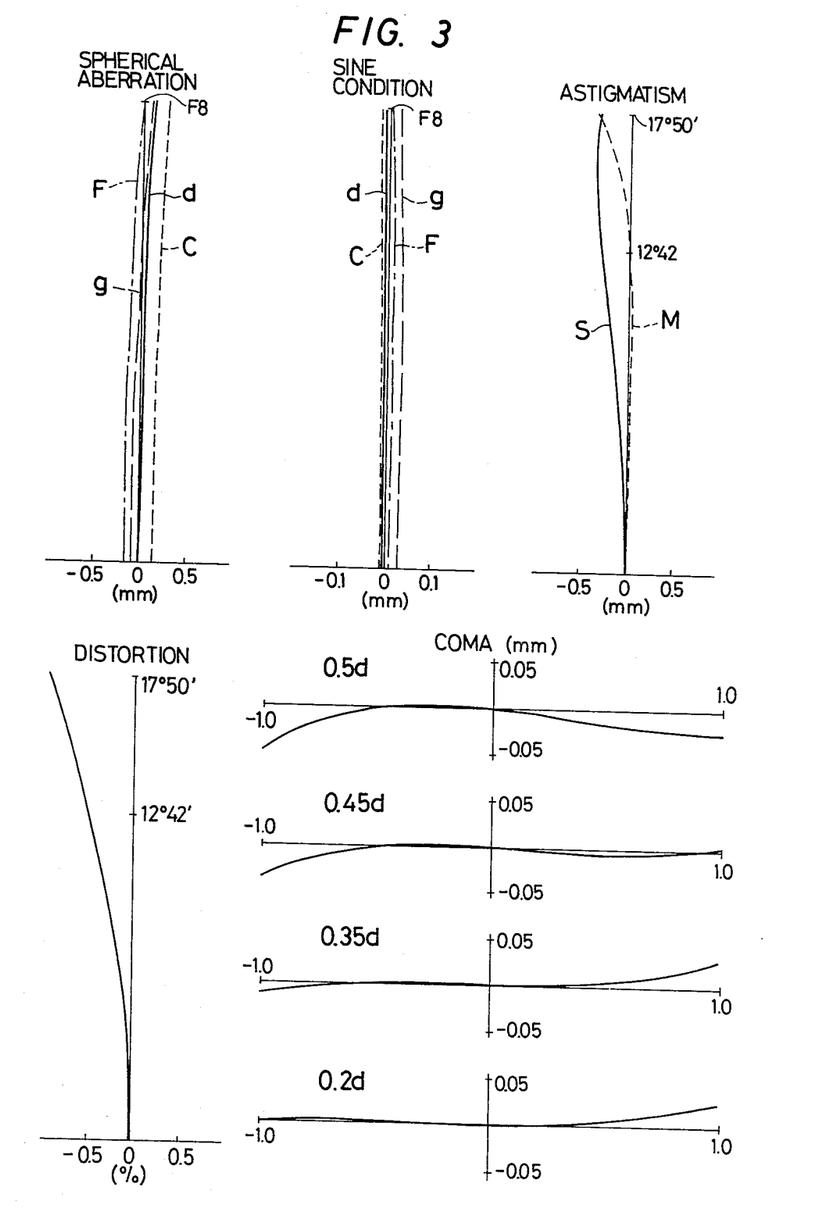
Figure 4:
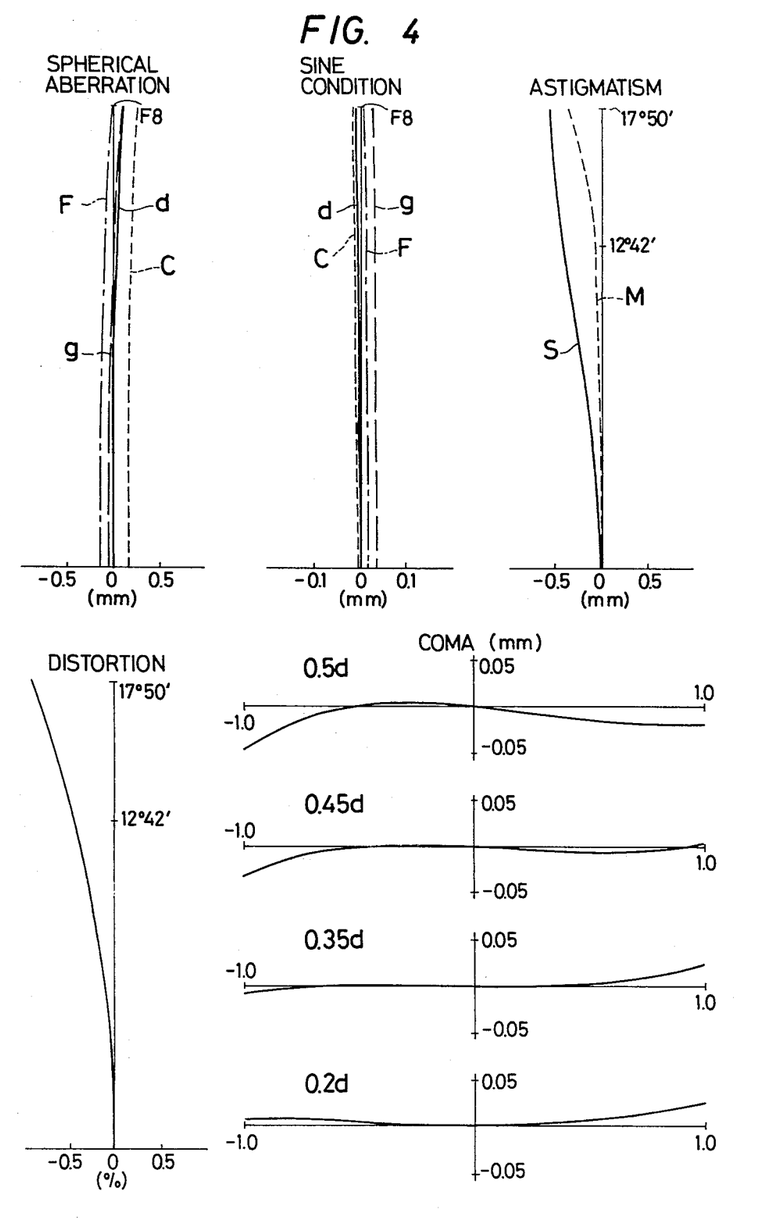
Figure 5:
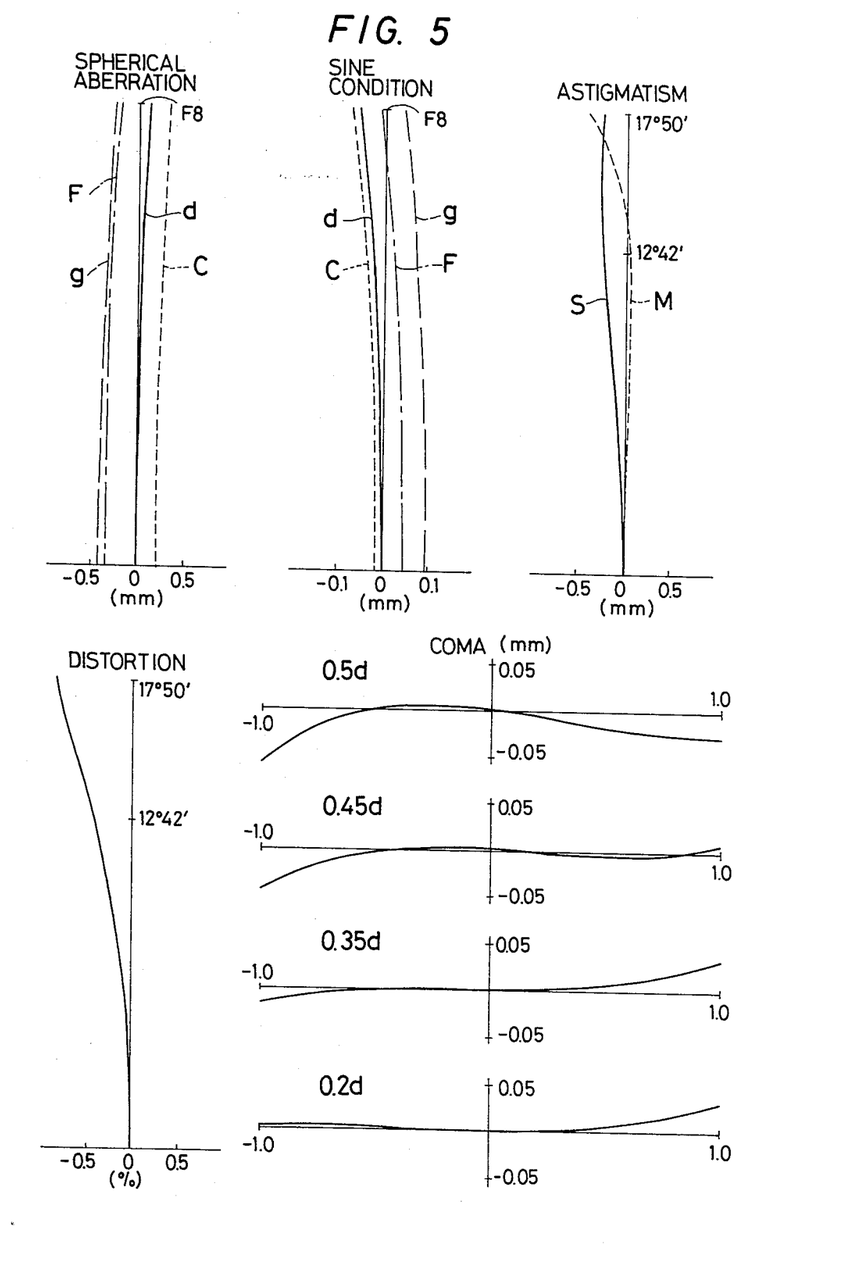
Figure 6:
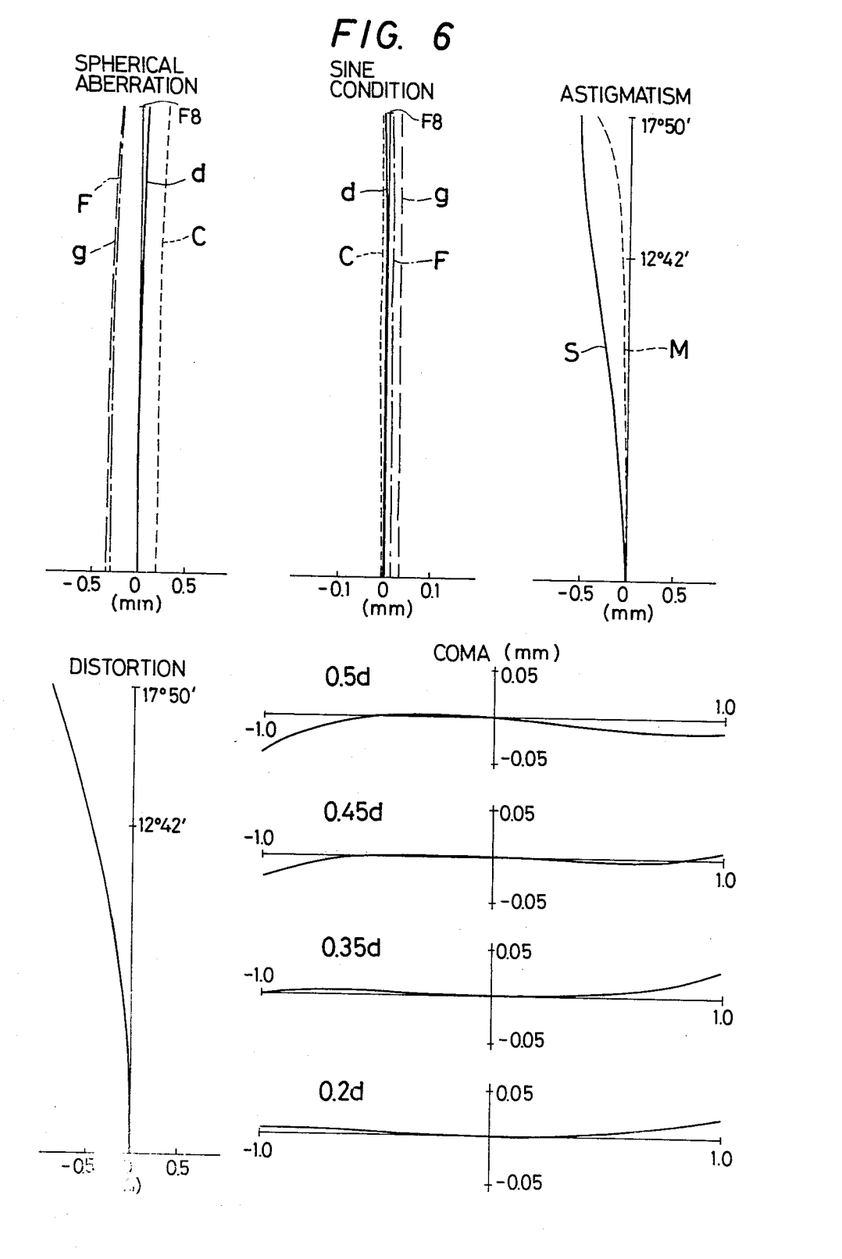

As shown in FIG. 1, a reducing lens system of the present invention is constituted of a first lens component of a positive lens, a second lens component of a negative lens and a third lens component of a positive lens, the lens system satisfying the following conditions.

| | |
|---|---|
| (1) | $1.73 > n_3 \geq n_1 > 1.63$ |
| | $1.65 > n_2 > 1.59$ |
| (2) | $61 > \nu_1, \nu_3 > 54$ |
| | $36 > \nu_2 > 33$ |
| (3) | $0.76f > f_1 > 0.71f$ |
| | $-0.30f > f_2 > -0.35f$ |
| | $0.48f > f_3 > 0.44f$ |
| (4) | $0.14f > d_1, d_2, d_5 > 0.11f$ |
| | $0.51f > \Sigma d > 0.48f$ |
| (5) | $0.52f > r_1 > 0.49f$ |
| | $-6.2f > r_2 > -17.0f$ |
| | $-0.43f > r_3 > -0.48f$ |
| | $0.38f > r_4 > 0.32f$ |
| | $1.32f > r_5 > 1.12f$ |
| | $-0.39f > r_6 > -0.44f$ | wherein the reference symbols $n_1$, $n_2$ and $n_3$ represent the refractive indices of the respective lenses, the symbols $\nu_1$, $\nu_2$ and $\nu_3$ represent the Abbe numbers of the respective lenses, the symbol f represents the focal length of the total lens system, the symbol $d_1$ and $d_5$ represent the axial thicknesses of the first and third lens components, the symbol $d_2$ represents the axial air space between the first and the second lens components, the symbol $\rho d$ represents the total length of the lens system and the symbol $r_1$ through $r_6$ represent the radii of curvature of the respective lens surfaces, respectively.

The object of the present invention is to provide a reducing lens system which has the reduction ratio of 1/10 and the vignetting factor of 100%. For this purpose, it is necessary both to decrease the coma flare and to obtain a good symmetry of coma. Therefore, the incident height of the ray of light entering the second and third lens components and the symmetry of the expanded luminous fluxes must be appropriate. For this reason, the distribution of the respective lens powers should be as given in condition (3). Under such power distribution in the respective lenses, in order to decrease the Petzval sum, the expression $$\sum_{i=1}^{3} \frac{1}{f_i n_i}$$

must be zero. In view of $f_1, f_3 > 0$, $f_2 < 0$, that is $$\frac{1}{f_1 n_1} + \frac{1}{f_3 n_3} > 0,$$

$$\frac{1}{f_2 n_2} < 0,$$

the condition must be $n_3 \geq n_1 > n_2$. In order to correct the chromatic aberration in the lens system as according to the present invention, the Abbe numbers $\nu_1$, $\nu_2$ and $\nu_3$ of the respective lenses must be $\nu_1, \nu_3 > \nu_2$ and the larger the differences between $\nu_1$ and $\nu_2$ and between $\nu_3$ and $\nu_2$ the better the effectiveness. Conditions (1) and (2) have been established in order to improve the Petzval sum and the chromatic aberration with the above mentioned points taken into account.

Under condition (1), when $n_1$ exceeds the lower limit, the Petzval sum is under-corrected. When $n_2$ exceeds the upper limit, the Petzval sum is likewise under-corrected. When $n_3$ exceeds the upper limit and $n_2$ the lower limit, the Petzval sum is well-corrected. However, it then becomes difficult to obtain the glass material which satisfies the requirements that the Abbe numbers $\nu_1$ and $\nu_3$ of the first lens component and the third lens component must be large and the Abbe number $\nu_2$ of the second lens component must be small in order to correct the chromatic aberration. Under condition (1), although the lower limits of $n_1$ and $n_3$ are slightly smaller than the upper limit of $n_2$, the relation must be $n_3 \geq n_1 > n_2$ and, therefore, it is necessary to meet this relation in selecting the glass material.

Next, under condition (2), when $\nu_1$ and $\nu_3$ exceed the lower limit, the axial chromatic aberration becomes large. When $\nu_1$ and $\nu_3$ exceed the upper limit, it becomes difficult to obtain a glass material which satisfies $n_3 \geq n_1 > 1.63$ of condition (1) for the purpose of correcting the Petzval sum. When $\nu_2$ exceeds the upper limit, the axial chromatic aberration becomes large and when $\nu_2$ exceeds the lower limit, it becomes difficult to obtain a glass material which satisfies $1.65 > n_2$ of condition (1).

Under condition (3), when $f_1$ exceeds the lower limit, the Petzval sum is under-corrected and the coma flare increases. When $f_1$ exceeds the upper limit, the spherical aberration is under-corrected and the symmetry of the coma is deteriorated. When $f_2$ exceeds the upper limit, although this is good for correcting the Petzval sum, the spherical aberration becomes large in the positive direction and the coma flare is increased. When $f_2$ exceeds the lower limit, the Petzval sum is under-corrected and symmetry of the coma is deteriorated. When $f_3$ exceeds the upper limit, although this is good for correcting the Petzval sum, the symmetry of the coma and the astigmatism are deteriorated. When $f_3$ exceeds the lower limit, the Petzval sum becomes large and the coma flare is increased.

As shown in condition (4), $d_1$, $d_2$ and $d_5$ are long relative to the total length of the lens system and this is necessary to keep a good symmetry of the luminous flux, that is, the symmetry of the coma. When $d_1$, $d_2$ and $d_5$ exceed the upper limit of condition (4), the spherical aberration is over-corrected and the astigmatism becomes large in the negative direction so that the symmetry of the coma is improved but the coma flare increases over the entire image surface. When these values exceed the lower limit of condition (4), the symmetry of the coma is deteriorated and the axial chromatic aberration becomes large.

As according to condition (4), by increasing $d_1$ and $d_5$, that is, by increasing the axial thicknesses of the first lens component and the third lens component, the radii of curvature $r_2$ and $r_5$ of the surface at the image side of the first lens component and the surface of the object side of the third lens component can be increased thereby to improve the correction of spherical aberration. Under condition (5), when $r_2$ and $r_5$ exceed the lower limit, the spherical aberration is over-corrected and the coma flare increases. This is due to the fact that when $r_2$ exceeds the lower limit, the incident height of the ray entering the second lens component becomes large so that the influence on the spherical aberration by the negative lens is increased. At the same time, the incident of height of the ray entering the third lens component also becomes large so that, in order to obtained required reduction ratio, the compensation must be made by decreasing $r_5$, in which case the coma flare increases. And, when $r_2$ and $r_5$ exceed the upper limit, the distortion becomes large and the symmetry of the coma deteriorates.

As explained above, the surfaces $r_2$ and $r_5$ are effective surfaces for the correction of the spherical aberration but these surfaces also have great influences on the coma. As shown under condition (4), by appropriately selecting $d_1$ and $d_5$, etc., the influences on the coma and the symmetry concerning the above mentioned surfaces are moderated.

With reference to $r_1$ and $r_6$, when they exceed the upper limit of condition (5), the spherical aberration is over-corrected, and when they exceed the lower limit, the inclination of these surfaces with respect to the incident and exit luminous fluxes becomes large and the coma flare is increased. When $r_3$ and $r_4$ exceed the upper limit of condition (5), the coma flare is increased, and when they exceed the lower limit, the spherical aberration is increased in the positive direction.

Further objects and advantages will be apparent in the arrangement as set forth in the following specification taken together with the accompanying drawings.

DESCRIPTION OF THE PREFERRED EMBODIMENTS

Now, some preferred embodiments of the present invention relating to the reducing lens system as described above are given below:

Embodiment 1
$f = 100$  F/8
$r_1 = 51.183$
$d_1 = 12.92$  $n_1 = 1.6968$  $v_1 = 56.49$
$r_2 = -1630.462$
$d_2 = 13.505$ -continued $r_3 = -45.819$
$d_3 = 2.205$  $n_2 = 1.64769$  $v_2 = 33.8$
$r_4 = 35.849$
$d_4 = 9.569$
$r_5 = 130.152$
$d_5 = 12.712$  $n_3 = 1.6968$  $v_3 = 56.49$
$r_6 = -39.39$
$f_1 = 71.444$  $f_2 = -30.727$
$f_3 = 44.775$
$\sum_{i=1}^{5} d_i = 50.911$ Embodiment 2
$f = 100$  F/8
$r_1 = 49.132$
$d_1 = 12.451$  $n_1 = 1.6516$  $v_1 = 58.7$
$r_2 = -1513.905$
$d_2 = 12.257$
$r_3 = -47.702$
$d_3 = 2.711$  $n_2 = 1.64769$  $v_2 = 33.8$
$r_4 = 37.053$
$d_4 = 8.934$
$r_5 = 122.6$
$d_5 = 12.946$  $n_3 = 1.72916$  $v_3 = 54.7$
$r_6 = -43.053$
$f_1 = 73.262$  $f_2 = -31.798$
$f_3 = 45.188$
$\sum_{i=1}^{5} d_i = 49.299$ Embodiment 3
$f = 100$  F/8
$r_1 = 50.133$
$d_1 = 12.169$  $n_1 = 1.64$  $v_1 = 60.1$
$r_2 = -896.534$
$d_2 = 11.592$
$r_3 = -47.427$
$d_3 = 2.869$  $n_2 = 1.5927$  $v_2 = 35.3$
$r_4 = 35.929$
$d_4 = 9.019$
$r_5 = 114.024$
$d_5 = 13.164$  $n_3 = 1.67$  $v_3 = 57.3$
$r_6 = -42.142$
$f_1 = 74.559$  $f_2 = -34.054$
$f_3 = 47.533$
$\sum_{i=1}^{5} d_i = 48.813$ Embodiment 4
$f = 100$  F/8
$r_1 = 49.764$
$d_1 = 12.513$  $n_1 = 1.63854$  $v_1 = 55.4$
$r_2 = -636.878$
$d_2 = 12.518$
$r_3 = -43.733$
$d_3 = 2.614$  $n_2 = 1.5927$  $v_2 = 35.3$
$r_4 = 33.216$
$d_4 = 9.367$
$r_5 = 113.146$
$d_5 = 12.91$  $n_3 = 1.6583$  $v_3 = 57.3$
$r_6 = -38.61$
$f_1 = 72.803$  $f_2 = -31.453$
$f_3 = 45.257$
$\sum_{i=1}^{5} d_i = 49.922$ Embodiment 5
$f = 100$  F/8
$r_1 = 50.993$
$d_1 = 12.266$  $n_1 = 1.6516$  $v_1 = 58.7$
$r_2 = -1149.926$
$d_2 = 11.864$
$r_3 = -47.83$
$d_3 = 2.727$  $n_2 = 1.5927$  $v_2 = 35.3$
$r_4 = 36.349$
$d_4 = 9.171$
$r_5 = 118.648$
$d_5 = 13.111$  $n_3 = 1.6779$  $v_3 = 55.3$
$r_6 = -42.559$
$f_1 = 75.238$  $f_2 = -$
$f_3 = 47.776$
$\sum_{i=1}^{5} d_i = 49.139$ wherein the reference symbols $r_1$ through $r_6$ represent the radii of curvature of the respective lenses surfaces, the symbols $d_1$ through $d_5$ represent the axial thicknesses and the axial air space of the respective lenses, the symbols $n_1$ through $n_3$ represent the refractive indices of the respective lenses and the symbols $\nu_1$ through $\nu_3$ represent the Abbe numbers of the respective lenses, respectively.

Seidel's coefficients of these embodiments are given below:

|   | Spherical aberration | Astigmatism | Coma | Distortion | Petzval sum |
|---|---|---|---|---|---|
|   | Embodiment 1 | | | | |
| 1 | 2.6014 | 0.0193 | 0.2243 | 0.0781 | 0.8869 |
| 2 | 1.6555 | 2.0302 | −1.8333 | −2.2791 | 0.0278 |
| 3 | −8.4156 | −2.7659 | 4.8246 | 2.1294 | −0.9483 |
| 4 | −8.8475 | −1.1458 | −3.1839 | −0.8485 | −1.2120 |
| 5 | 2.1868 | 1.3571 | 1.7227 | 1.3438 | 0.3488 |
| 6 | 11.3327 | 0.3751 | −2.0619 | −0.2779 | 1.1524 |
| Σ | 0.5132 | −0.13 | −0.3075 | 0.1458 | 0.2555 |
|   | Embodiment 2 | | | | |
| 1 | 2.9078 | 0.0295 | 0.2928 | 0.0923 | 0.8872 |
| 2 | 1.5243 | 1.7869 | −1.9659 | −1.9659 | 0.0288 |
| 3 | −8.3489 | −2.5715 | 1.9324 | 1.9324 | −0.9104 |
| 4 | −9.5260 | −1.1746 | −0.8240 | −0.8240 | −1.1721 |
| 5 | 2.6241 | 1.3876 | 1.2854 | 1.2854 | 0.3800 |
| 6 | 10.4065 | 0.4301 | −0.3075 | −0.3075 | 1.0821 |
| Σ | −0.4121 | −0.1119 | 0.2128 | 0.2128 | 0.2956 |
|   | Embodiment 3 | | | | |
| 1 | 2.7473 | 0.0437 | 0.3465 | 0.1139 | 0.8592 |
| 2 | 1.5601 | 1.7179 | −1.6371 | −1.8532 | 0.0480 |
| 3 | −8.3565 | −2.4333 | 4.5093 | 1.7804 | −0.8660 |
| 4 | −9.3285 | −1.0904 | −3.1893 | −0.7636 | −1.1432 |
| 5 | 2.3761 | 1.2624 | 1.7319 | 1.2032 | 0.3883 |
| 6 | 10.6990 | 0.3915 | −2.0466 | −0.2759 | 1.0508 |
| Σ | −0.3026 | −0.1082 | −0.2853 | 0.2048 | 0.3371 |
|   | Embodiment 4 | | | | |
| 1 | 2.7742 | 0.0274 | 0.2757 | 0.0886 | 0.8642 |
| 2 | 1.7722 | 1.9093 | −1.8395 | −2.0519 | 0.0675 |
| 3 | −9.1180 | −2.6389 | 4.9053 | 1.9248 | −0.9390 |
| 4 | −11.1155 | −1.1464 | −3.5698 | −0.7652 | −1.2364 |
| 5 | 2.7797 | 1.3867 | 1.9633 | 1.2530 | 0.3872 |
| 6 | 12.5201 | 0.3431 | −2.0725 | −0.2446 | 1.1346 |
| Σ | −0.3874 | −0.1188 | −0.3375 | 0.2046 | 0.2781 |
|   | Embodiment 5 | | | | |
| 1 | 2.6272 | 0.0438 | 0.3391 | 0.1159 | 0.8540 |
| 2 | 1.4659 | 1.6974 | −1.5774 | −1.8672 | 0.0379 |
| 3 | −8.0610 | −2.4071 | 4.4050 | 1.7847 | −0.8588 |
| 4 | −8.8828 | −1.0730 | −3.0873 | −0.7657 | −1.1301 |
| 5 | 2.2021 | 1.2405 | 1.6528 | 1.2132 | 0.3759 |
| 6 | 10.4595 | 0.3964 | −2.0362 | −0.2812 | 1.0479 |
| Σ | −0.1891 | −0.1021 | −0.3041 | 0.1996 | 0.3267 |

As explained hereinabove, the reducing lens system according to the present invention has a vignetting factor of 100% and provides the effect that a ray of light is not eclipsed and, thus, the brightness of the image is uniform to the periphery of image surface. The aperture ratio is F/8 and so the lens speed is high enough from the practical point of view. The lens system of this kind is sometimes used with parallel plain boards being placed on the surface of the original paper to be copied and on the surface of projection. However, with the lens system according to the present invention, whether the parallel plain boards are placed or removed, the aberrations are very little deteriorated and excellent image formation characteristics can be maintained.

I claim:

1. A reducing lens system comprising a first lens component of a biconvex lens, a second lens component of a biconcave lens and a third lens component of a biconvex lens, the said lens system satisfying the following conditions:

(1) $1.73 > n_3 \geq n_1 > 1.63$
$1.65 > n_2 > 1.59$
(2) $61 > \nu_1, \nu_3 > 54$
$36 > \nu_2 > 33$
(3) $0.76f > f_1 > 0.71f$
$-0.30f > f_2 > -0.35f$
$0.48f > f_3 > 0.44f$
(4) $0.14f > d_1, d_2, d_5 > 0.11f$
$0.51f > \Sigma d > 0.48f$
(5) $0.52f > r_1 > 0.49f$
$-6.2f > r_2 > -17.0f$
$-0.43f > r_3 > -0.48f$
$0.38f > r_4 > 0.32f$
$1.32f > r_5 > 1.12f$
$-0.39f > r_6 > -0.44f$ wherein the reference symbols $n_1$ through $n_3$ represent the refractive indices of the respective lenses, the symbols $\nu_1$ through $\nu_3$ represent the Abbe numbers of the respective lenses, the symbols $f_1$ through $f_3$ represent the focal length of the respective lenses, the symbols $d_1$ and $d_5$ represent the axial thicknesses of the first and third lens components, the symbol $d_2$ represents the axial air space between the first and second lens components, the symbol $\Sigma d$ represents the total length of the lens system, the symbols $r_1$ through $r_6$ represent the radii of curvature of the respective lens surfaces and the symbol $f$ represents the focal length of the total lens system, respectively.

2. A reducing lens system according to claim 1, having the following data:

| $f = 100$ | F/8 | | | |
|---|---|---|---|---|
| $r_1 = 51.183$ | | | | |
|   | $d_1 = 12.92$ | $n_1 = 1.6968$ | $\nu_1 = 56.49$ | |
| $r_2 = -1630.462$ | | | | |
|   | $d_2 = 13.505$ | | | |
| $r_3 = 45.819$ | | | | |
|   | $d_3 = 2.205$ | $n_2 = 1.64769$ | $\nu_2 = 33.8$ | |
| $r_4 = 35.849$ | | | | |
|   | $d_4 = 9.569$ | | | |
| $r_5 = 130.152$ | | | | |
|   | $d_5 = 12.712$ | $n_3 = 1.6968$ | $\nu_3 = 56.49$ | |
| $r_6 = -39.39$ | | | | |
| $f_1 = 71.444$ | $f_2 = -30.717$ | | | |
| $f_3 = 44.775$ | $\sum_{i=1}^{5} d_i = 50.911$ | | | | wherein the reference symbols $r_1$ through $r_6$ represent the radii of curvature of the respective lens surfaces, the symbols $d_1$ through $d_5$ represent the axial thicknesses and the axial air spaces of the respective lenses, the symbols $n_1$ through $n_3$ represent the refractive indices of the respective lenses, the symbols $\nu_1$ through $\nu_3$ represent the Abbe numbers of the respective lenses and the symbol F represents the aperture ratio, respectively.

3. A reducing lens system according to claim 1, having the following data:

| $f = 100$ | F/8 | | | |
|---|---|---|---|---|
| $r_1 = 49.132$ | | | | |
|   | $d_1 = 12.451$ | $n_1 = 1.6516$ | $\nu_1 = 58.7$ | |
| $r_2 = 1513.905$ | | | | |
|   | $d_2 = 12.257$ | | | |
| $r_3 = 47.702$ | | | | |
|   | $d_3 = 2.711$ | $n_2 = 1.64769$ | $\nu_2 = 33.8$ | |
| $r_4 = 37.053$ | | | | |
|   | $d_4 = 8.934$ | | | |
| $r_5 = 122.6$ | | | | |
|   | $d_5 = 12.946$ | $n_3 = 1.72916$ | $\nu_3 = 54.7$ | |
| $r_6 = -43.053$ | | | | |
| $f_1 = 73.262$ | $f_2 = -31.798$ | | | |

-continued

| $f = 100$ | | F/8 | |
|---|---|---|---|
| | $f_3 = 45.188$ | $\sum_{i=1}^{5} d_i = 49.299$ | | wherein the reference symbols $r_1$ through $r_6$ represent the radii of curvature of the respective lens surfaces, the symbols $d_1$ through $d_5$ represent the axial thicknesses and the axial air spaces of the respective lenses, the symbols $n_1$ through $n_3$ represent the refractive indices of the respective lenses, the symbols $\nu_1$ through $\nu_3$ represent the Abbe numbers of the respective lenses and the symbol F represents the aperture ratio, respectively.

4. A reducing lens system according to claim 1, having the following data:

| $f = 100$ | | F/8 | |
|---|---|---|---|
| $r_1 = 50.133$ | | | |
| | $d_1 = 12.169$ | $n_1 = 1.64$ | $\nu_1 = 60.1$ |
| $r_2 = 896.534$ | | | |
| | $d_2 = 11.592$ | | |
| $r_3 = -47.427$ | | | |
| | $d_3 = 2.869$ | $n_2 = 1.5927$ | $\nu_2 = 35.3$ |
| $r_4 = 35.929$ | | | |
| | $d_4 = 9.019$ | | |
| $r_5 = 114.024$ | | | |
| | $d_5 = 13.164$ | $n_3 = 1.67$ | $\nu_3 = 57.3$ |
| $r_6 = 42.142$ | | | |
| | $f_1 = 74.559$ | $f_2 = -34.054$ | |
| | $f_3 = 47.533$ | $\sum_{i=1}^{5} d_i = 48.813$ | | wherein the reference symbols $r_1$ through $r_6$ represent the radii of curvature of the respective lens surfaces, the symbols $d_1$ through $d_5$ represent the axial thicknesses and the axial air spaces of the respective lenses, the symbols $n_1$ through $n_3$ represent the refractive indices of the respective lenses, the symbols $\nu_1$ through $\nu_3$ represent the Abbe numbers of the respective lenses and the symbol F represents the aperture ratio, respectively.

5. A reducing lens system according to claim 1, having the following data:

| $f = 100$ | | F/8 | |
|---|---|---|---|
| $r_1 = 49.764$ | | | |
| | $d_1 = 12.513$ | $n_1 = 1.63854$ | $\nu_1 = 55.4$ |
| $r_2 = -636.878$ | | | |
| | $d_2 = 12.518$ | | |
| $r_3 = -43.733$ | | | |
| | $d_3 = 2.614$ | $n_2 = 1.5927$ | $\nu_2 = 35.3$ |
| $r_4 = 33.216$ | | | |
| | $d_4 = 9.367$ | | |
| $r_5 = 113.146$ | | | |
| | $d_5 = 12.91$ | $n_3 = 1.6583$ | $\nu_3 = 57.3$ |
| $r_6 = -38.61$ | | | |
| | $f_1 = 72.803$ | $f_2 = -31.453$ | |
| | $f_3 = 45.257$ | $\sum_{i=1}^{5} d_i = 49.922$ | | wherein the reference symbols $r_1$ through $r_6$ represent the radii of curvature of the respective lens surfaces, the symbols $d_1$ through $d_5$ represent the axial thicknesses and the axial air spaces of the respective lenses, the symbols $n_1$ through $n_3$ represent the refractive indices of the respective lenses, the symbols $\nu_1$ through $\nu_3$ represent the Abbe numbers of the respective lenses and the symbol F represents the aperture ratio, respectively.

6. A reducing lens system according to claim 1, having the following data:

| $f = 100$ | | F/8 | |
|---|---|---|---|
| $r_1 = 50.993$ | | | |
| | $d_1 = 12.266$ | $n_1 = 1.6516$ | $\nu_1 = 58.7$ |
| $r_2 = -1149.926$ | | | |
| | $d_2 = 11.864$ | | |
| $r_3 = -47.83$ | | | |
| | $d_3 = 2.727$ | $n_2 = 1.5927$ | $\nu_2 = 35.3$ |
| $r_4 = 36.349$ | | | |
| | $d_4 = 9.171$ | | |
| $r_5 = 118.648$ | | | |
| | $d_5 = 13.111$ | $n_3 = 1.6779$ | $\nu_3 = 55.3$ |
| $r_6 = 42.559$ | | | |
| | $f_1 = 75.238$ | $f_2 = -34.431$ | |
| | $f_3 = 47.776$ | $\sum_{i=1}^{5} d_i = 49.139$ | | wherein the reference symbols $r_1$ through $r_6$ represent the radii of curvature of the respective lens surfaces, the symbols $d_1$ through $d_5$ represent the axial thicknesses and the axial air spaces of the respective lenses, the symbols $n_1$ through $n_3$ represent the refractive indices of the respective lenses, the symbols $\nu_1$ through $\nu_3$ represent the Abbe numbers of the respective lenses and the symbol F represents the aperture ratio, respectively.

* * * * *